United States Patent [19]
Lapeyre

[11] 3,724,285
[45] Apr. 3, 1973

[54] CONVEYOR DRIVE
[76] Inventor: James M. Lapeyre, 13 Richmond Place, New Orleans, La.
[22] Filed: Apr. 17, 1972
[21] Appl. No.: 244,773

Related U.S. Application Data

[63] Continuation-in-part of Ser. No. 187,746, Oct. 8, 1971, which is a continuation-in-part of Ser. No. 63,523, Aug. 13, 1970, abandoned.

[52] U.S. Cl. .............................. 74/243 FC, 74/243 R
[51] Int. Cl. ................................................ F16h 55/30
[58] Field of Search............ 74/243 FC, 243 R, 231 R

[56] References Cited

UNITED STATES PATENTS

| | | | |
|---|---|---|---|
| 687,146 | 11/1901 | Fleckenstein | 74/243 FC |
| 1,258,183 | 3/1918 | Bucher | 74/243 R |
| 3,029,654 | 4/1962 | Hill | 74/243 R X |

Primary Examiner—Leonard H. Gerin
Attorney—Robert J. Schiller et al.

[57] ABSTRACT

A sprocket drive assembly designed for a modular chain link conveyor belt subject to relatively large variations in width due to changing ambient conditions such as large cyclic temperature changes. The assembly includes a drive shaft with a square cross section and a plurality of sprockets mounted on the shaft for rotation thereby. One sprocket is fixed against axial movement to provide for proper belt tracking while the remaining sprockets, the number depending upon the width of the belt and the load carried thereby, are located on opposite sides of the fixed sprocket and are free to move axially to accommodate for changes in belt width.

17 Claims, 4 Drawing Figures

CONVEYOR DRIVE

This application is a continuation-in-part of copending U.S. Pat. application Ser. No. 187,746 filed Oct. 8, 1971, in turn a continuation-in-part of U.S. Pat. application Ser. No. 63,523, filed Aug. 13, 1970, now abandoned.

This invention is concerned with conveyors, and particularly with an improved conveyor including a novel sprocket drive assembly.

In the aforementioned U.S. Pat. applications, there is shown and described a chain link conveyor belt formed of a multiplicity of pivotally interlocked and generally rectangular modules each including end sections in the form of spaced links with aligned holes for pivot rods which pivotally join the modules, and a connecting section for supporting objects carried by the conveyor belt. The end sections of pivotally connected modules are intermeshed and arranged in overlapping relation in the direction of belt travel. Both the width and length of the belt can be varied by changing the number of modules. The link modules are designed to be formed simply by molding polymeric plastics and are especially suited for use under severe operating conditions, especially intermittent and cyclic changes in ambient conditions including temperature and processing or cleaning fluids. Typical operating environments are those encountered, for example, in food processing and packaging where the material being conveyed is subjected to a variety of processing operations involving different liquids and a wide range of temperatures.

Employing conveyor belting of this type under varying loads and changing ambient conditions ranging, for example, from immersion in boiling water or steam to temperatures near or below freezing, presents a number of difficult problems with regard to the driving and supporting structures for the belting. For example, such structures should match the belt in capability to stand up under the same severe operating environments, and should also accommodate a variety of belt widths as well as compensate for rapid and/or cyclic belt width variations due to expansion and shrinkage resulting from ambient condition changes, particularly, temperature, while also assuring proper tracking of the conveyor belt. The conveyor belt described in said applications is particularly adapted for ease of cleaning and operation without lubrication and these advantages, particularly in food processing, are also desired of the support and drive system.

Objects of the invention are to provide a novel and improved sprocket drive assembly readily adaptable for different width chain link conveyor belts of the type described; to provide such an assembly capable of operating reliably with proper tracking of a conveyor belt under a wide range of operating conditions and loads and to provide such an assembly capable of accommodating cyclic and substantial variations in belt width.

These and other objects of the invention are achieved in an assembly including a drive shaft of non-circular cross-section, and a plurality of sprockets preferably formed of a molded organic polymer, mounted in driven relation on the shaft. All of the sprockets but one, which is preferably centrally located, are freely movable axially on the shaft to accommodate for changes in belt width while the fixed sprocket, which is readily removable, assures proper tracking of the belt.

Other objects of the invention, will, in part, be obvious and will, in part, appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 2:
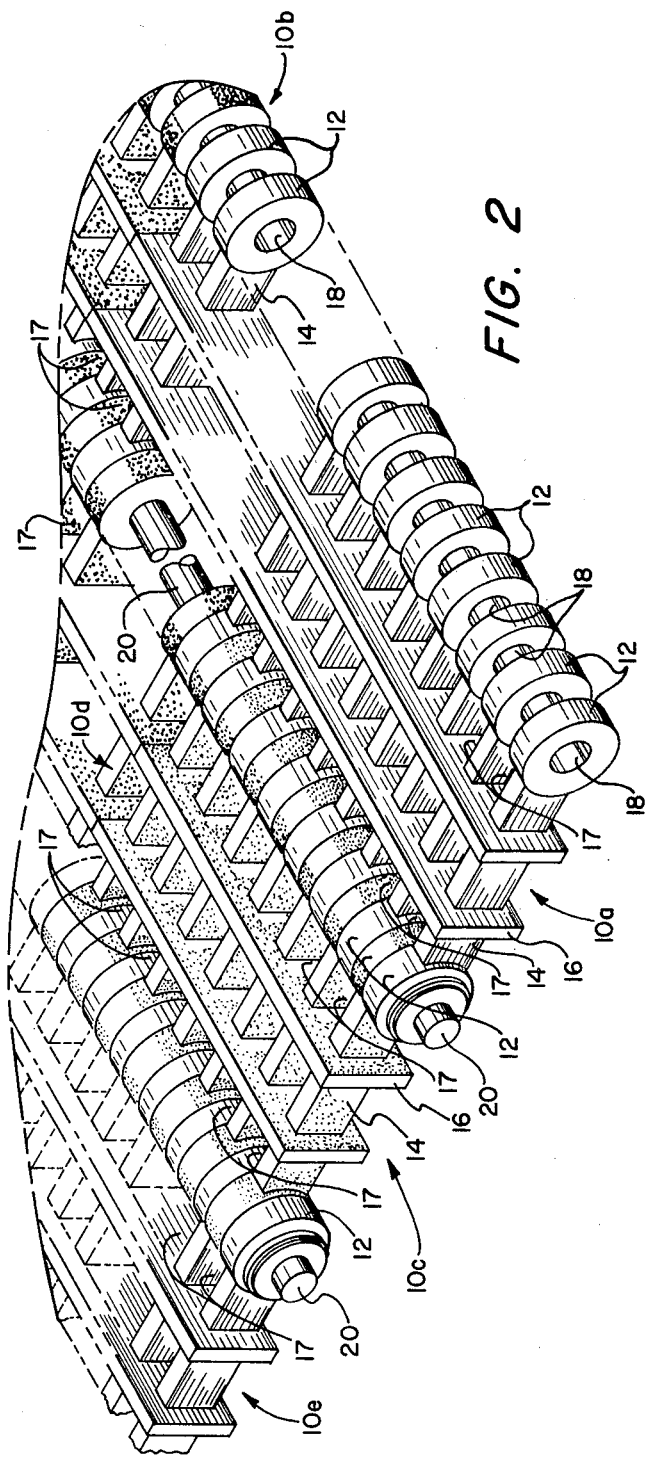
FIG. 2 is a perspective view of a portion of a conveyor belt typical of those employed in conjunction with the invention.

The drive shaft and sprocket assembly of the invention is especially designed for use with a chain link conveyor belt of the type described in the aforementioned application and illustrated, for example in FIG. 2 of the drawings. The conveyor belt is composed of a multiplicity of similar link modules generally designated 10, pivotally connected end-to-end in overlapping, "-bricklayer" relation. Each module 10 is designed to be formed as an integral unit, preferably of a polymeric plastic material, by a conventional molding process and, in the form shown, comprises a multiplicity of elongated, parallel, spaced link-like elements each including end sections 12 joined by an intermediate connecting section 14. The link-like elements are joined as a unit by at least one and preferably a pair of spaced cross-members 16 formed integrally with connecting sections 14 to form a rigid, open grid or perforated structure. End sections 12 are wider and deeper than connecting sections 14 to form openings between links and are formed with parallel planar facing surfaces each spaced from adjacent surfaces by just slightly greater (e.g. 0.003 inch) than the thickness (width) of the end sections so that the end sections of the link elements of each module fit snugly but movably between the end sections of every other module with the parallel facing surfaces in contact with one another. Each of end sections 12 is formed so as to circumscribe a corresponding one of aligned holes 18 for receiving pivot pins or rods 20 adapted to pivotally connect the modules end-to-end while laterally aligning adjacent modules.

The ends of the cross-members extend beyond the immediate sections of the lateral link-like elements to planes spaced from the center surfaces of the end section by half thickness thereof so that cross-members of laterally adjacent modules will abut one another when assembled as a conveyor belt. Cross-members 16 function to maintain the link-like elements in parallel relation so that the faces of end sections 12 are kept parallel and pivot holes 18 are kept aligned, thereby placing rods 20 in multiple shear and minimizing bending stresses across the rods. End sections 12 have at least a particlly circular cross-section (when viewed in side elevation) and a depth equal to the depth of cross-members 16 so that both portions of the upper and lower edges or surfaces of the end sections and cross-members are located in substantially parallel planes, for self supporting a belt made of a number of coupled modules as well as articles carried thereon.

A multiplicity of modules 10 are assembled in end-to-end and side-by-side relation to form a conveyor by pivot rods 20. Cross-members 16 function to absorb lateral forces on the link-like elements tending to separate the links, as well as bending forces on the modules tending to bend the pivot pins. Additionally, where the end sections are formed with parallel planar facing surfaces spaced so that the end sections of another like module fit or mate snugly yet with a minimum of friction, the fit of the end sections constitutes significantly to the ability of pivot-connected modules to resist deformation due to bending forces across the axis of the pivot pin. Thus, each pivot pin is subjected primarily to a large number of small shear forces so that the strength requirements for the pivot pins are small as compared with a conveyor composed of individual chain links. The use of circumscribed holes 18, i.e., holes completely surrounded by the material of the end section, of course permits the pins to positively lock respective modules together while permitting independent rotation of end-to-end connected modules about the pins. To add strength to a conveyor made up of rows of modules located side-by-side, the modules of each row are staggered with respect to the modules of adjacent rows as shown in FIG. 2, in which different modules are designated 10a, 10b, 10c, 10 d and 10 e. In this way, the joints of adjacent modules in each row fall at an intermediate position, typically midway between the sides of adjacent modules in the next row, so that, in effect, the cross-members overlap in bricklayer fashion to resist bending stresses which might otherwise be transmitted to the pivot pins. A conveyor of any desired width can be formed by employing whole modules or portions thereof as shown in FIG. 2.

When such modules are assembled as in FIG. 2 to form a belt or mesh, the openings such as 17 between adjacent end sections 12 of one module are offset the width of an end section 12 with respect to corresponding openings 17 of the other connected module. Thus, to drive each successive module with a wheel or sprocket having teeth intended to fit into openings 17, the sprocket teeth are alternately offset axially from one another by the width of an end section 12 of the modules. However, a sprocket wheel having a series of successive in-line teeth can be used if the "offset" is provided in the module itself. To achieve this, the end sections of each link-like element are offset so that intermediate sections 14 of each link-like element lie along a straight line which meets corresponding end sections 12 the latter being formed as described, with aligned holes 18 for rods 20 at a slight angle.

A typical use of a conveyor including a belt and support and drive assembly providing a severe test of its design is in the processing of food products involving a corrosive liquid such as salt water. Heretofore, conveyors for such purposes have been formed of stainless steel to resist corrosion and permit cleaning including, for example, the use of detergents and steam. Understandably, such conveyors are difficult and expensive to fabricate and assemble; are heavy thus necessitating substantial and expensive support and driving structures and requiring large amounts of power to operate; wear out rapidly because of the difficulty in providing for lubrication; tend to break when bent or stressed; and are difficult to repair. The conveyor module is intended to be formed of a relatively light weight, organic polymeric plastic material such as polethylene, polypropylene, polycarbonate, or the like, which is compatible with corrosive liquids and atmospheres and can be formed by conventional molding processes.

Figure 1:
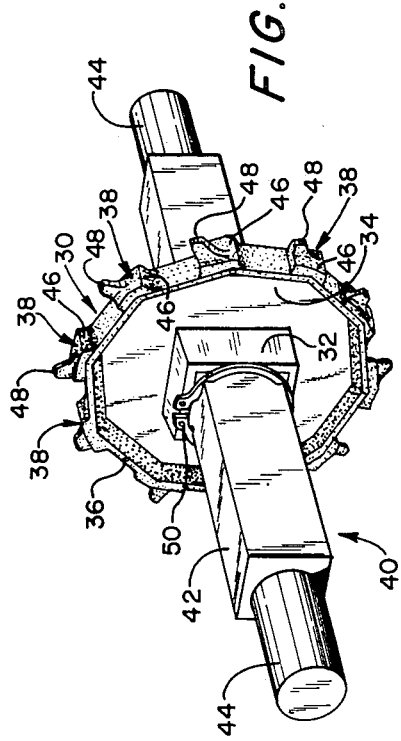
FIG. 1 is a perspective view of a drive shaft and sprocket assembly embodying the invention.
Figure 3:
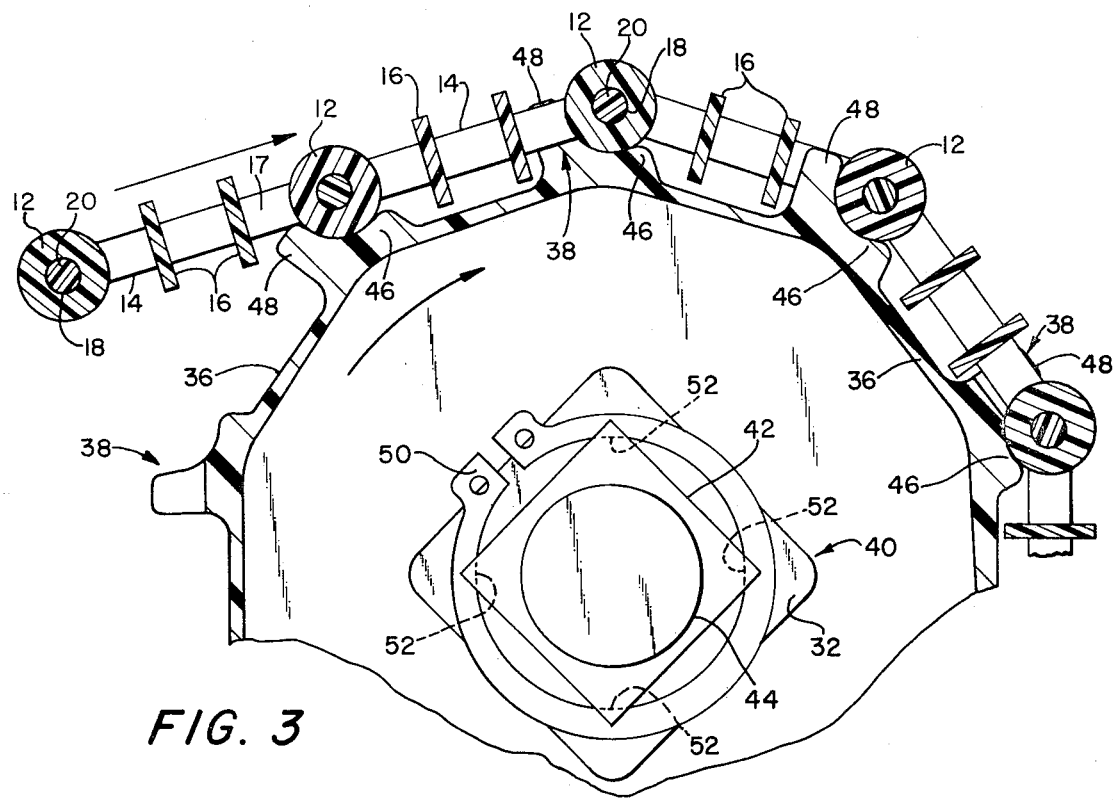
FIG. 3 is an elevation view, partially in section, showing the drive shaft and sprocket assembly in engagement with the chain link belt of FIG. 2, and FIG. 4 a front elevation view in section showing an assembly of the present invention involving a plurality of sprockets.

Reference is now made to FIGS. 1 and 3 of the drawings wherein there are illustrated, respectively, a shaft and sprocket drive assembly in perspective, and in elevation and partial section in combination with a conveyor belt of the type illustrated in FIG. 2. All sprockets, each designated 30, (only one is shown), are substantially identical. The sprocket takes the general form of a wheel having a hub 32, a generally circular web or flange 34 extending radially from the hub and a peripheral rim 36 including a multiplicity of radially extending teeth generally designated 38. Sprocket 30 is designed to be formed of a polymeric plastic material or metal, by conventional molding methods. Plastics such as employed in the belt links, particularly materials such as polycarbonates, are preferred because of their strength combined with light weight, wear and impact resistance, compatibility with a variety of atmospheres, resistance to damage resulting from changes in ambient conditions such as temperature, humidity, etc., ease of cleaning, and low cost should replacement be required.

The sprocket 30 is designed to be mounted in driven (torsional) engagement on a support and drive shaft designated 40, preferably having a uniform square cross section throughout the length of the sprocket suspension portion of the shaft. Although other noncircular cross sections such as hexagonal may be employed, the square cross section is preferred because it provides maximum strength coupled with maximized driving force-imparting surfaces and corners, is symmetrical with respect to the rotational axis and lends itself to fabrication simply and easily of a variety or combination of materials.

A typical shaft illustrated in FIG. 1 includes a square cross-sectioned sprocket drive and support section 42 and cylindrical end sections on which the shaft is adapted to be mounted for rotation. Metals such as aluminum and steel are preferred for strength, the former having the advantage of lightness and ease of fabrication. Combinations of materials may be employed to advantage such as a cylindrical steel shaft, either solid or hollow, preferred for both strength and cost, around which is secured a sleeve having a square, external configuration, formed of aluminum or other material selected because of its lightness, ease of fabrication, e.g. adaptability to molding or extrusion, and/or its resistance to damage by the environment in which it is designed to operate. In most instances, aluminum drive shafts will be anodized and/or coated with a protective polymer such as polytetrafluorocthylene which is resistant to both harsh environments and wear resulting from axial motion of the sprockets. However, the latter, when formed of plastics, have a low coefficient of friction thus resulting in ease of axial motion as well as reducing or eliminating drive shaft wear. For particular applications, it may be desirable to form the drive shaft sleeve entirely of a relatively inert material such as stainless steel or a polymeric plastic which is the same as or similar to that comprising the belt links and/or sprockets.

Hub 32 of sprocket 38 is relatively long axially to provide for maximum driving engagement surface area for contacting the shaft and has a symmetrical square external configuration to minimize material cost without sacrificing torsional strength. The flange or web portion 34 of the sprocket is relatively thin (axially) and supports the rim section 36 which is relatively wise in order to provide support for the adjacent end sections 18 of at least two pivotty connected conveyor belt links. The belt is preferably supported at end sections 18 so that there is clearance between the sprocket rim and connecting sections 14 and cross-members 16 of the belt to provide for fluid circulation through and around the belt at the sprockets. For this purpose, the sprocket teeth, generally designated 38, each include a shoulder portion 46 having a cylindrical surface sufficiently wide (axially) to engage and support at least two adjacent end sections 18 of connected belt links. The external peripheral surface of the sprocket rim 36 between teeth is substantially planar in the form shown. Extending radially from the shoulder portion of each tooth is a relatively narrow (axially) end or drive portion adapted to project into an opening 17 between connecting sections 14 and a cross-member 16 into driving engagement with an end section 12 of a belt link. End portion 48 of teeth 38 are shown offset axially as required by the modular belt link construction shown in FIG. 2. The sprocket includes an even number of teeth (ten as shown) so that there are an equal number of teeth offset in each direction.

Figure 4:
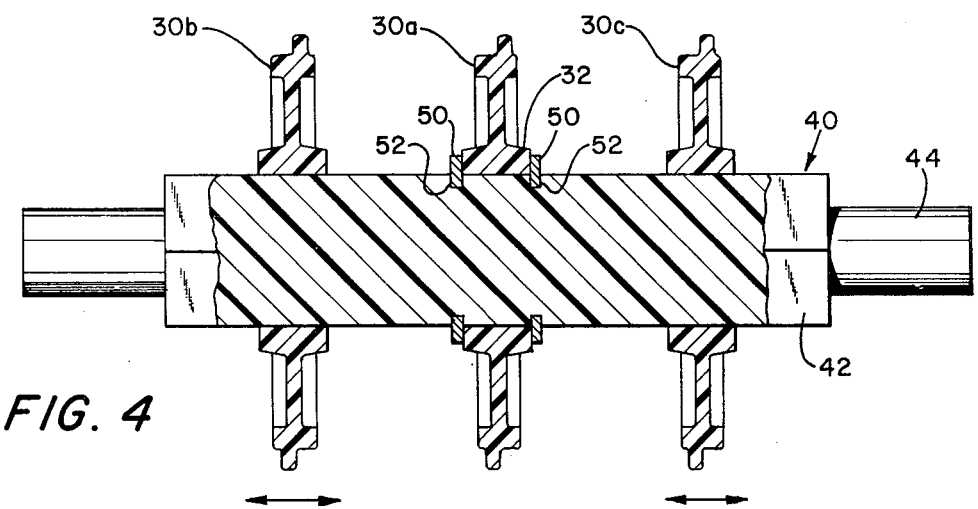

As shown particularly in FIG. 4, each drive shaft and sprocket assembly will include at least two and preferably three sprockets with one of the sprockets 30a being fixed against axial motion in order to insure proper tracking of the belt. The other sprocket or sprockets 30b and 30c, the number being dependent upon belt width and loading, are free to move axially on drive shaft 40 in order to accommodate for variations in belt width resulting from various factors, primarily large changes in temperature. The hub hole size and shaft sizes are designed to permit this freedom of motion while the square cross section is ideally suited to permit axial motion and simultaneously prevent rotational motion of the shaft relative to the sprocket.

Since all of the sprockets are substantially identical and interchangable, at least for a particular belt design, the retaining means for releasably maintaining one of the sprockets against axial motion are mounted on the drive shaft. These means are located preferably so as to axially fix the sprocket closest the center of the belt when there are three or more sprockets thereby minimizing the axial motion of the other sprockets. In the form shown particularly in FIG. 1 the retaining means comprise conventional C rings 50 engaged around the drive shaft in grooves 52 formed in the corners of the shaft. The rings and grooves 50 and 52 are spaced by a distance approximately equal to the axial length of a sprocket hub 32, to prevent motion of the hub. C rings are used and preferred because they can be removed easily for sprocket replacement while the grooves 52 in which they are engaged have the advantages that they do not interfere with axial sprocket motion when changing sprockets nor do they significantly weaken the shaft. This structure is also simple, inexpensive and easy to form and to maintain and tends to remain clean and free of accumulation of materials carried on the conveyor.

In keeping with many of the advantages of the design conveyor link modules, the sprocket is also designed to be formed of a polymeric plastic material by conventional molding methods. Similarly, the design of the sprocket and the choice of the particular materials employed are based on such factors as strength, durability, resistance to ambient conditions, wear and impact resistance, relatively low cost and freedom from maintainence problems including lubrication. Changing sprockets and any other maintainence are convenient and easy.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A sprocket and drive shaft assembly for a chain link conveyor belt subject to variations in width comprising, in combination:
   a drive shaft with a substantially uniform, noncircular cross section; and
   a plurality of sprockets mounted in driven engagement on said shaft for supporting and driving a conveyor belt; one of said sprockets being releasably locked against axial motion to provide for proper belt tracking, all other of said sprockets being free to move axially.

2. A sprocket and drive shaft assembly as defined in claim 1 including at least three of said sprockets, wherein said one sprocket locked against axial motion is centrally located with respect to said other sprockets.

3. A sprocket and drive shaft assembly as defined in claim 1 wherein said shaft has a square cross section and said sprockets are formed with square holes for sliding engagement around said shaft.

4. A support and drive assembly for a conveyor belt composed of link modules having intermediate sections and intermeshed end sections pivotally connected to one another, said assembly comprising, in combination:
   a linear rotary shaft having a substantially uniform, noncircular cross section throughout a major portion of its length;
   a plurality of sprockets mounted on said shaft each including a hub, a wheel portion and teeth extending radially therefrom for supporting the end sections of the link modules of a conveyor belt and projecting into openings in the belt into driving engagement with the end sections;
   said hubs being formed with an axial opening therethrough adapted to fit in driving engagement around said shaft while providing sufficient clearance between the surfaces of said holes and said shaft to permit free axial motion of said sprockets on said shaft; and means engaged with said shaft for releasably restraining one of said sprockets against axial movement to insure proper tracking of said belt, all other sprockets mounted on said shaft being movable axially to accommodate variations in the width of the belt.

5. A support and drive assembly as defined in claim 4 wherein said shaft has a rectilinear cross section and said openings in said sprockets conform to said shaft.

6. A support and drive assembly as defined in claim 4 wherein said noncircular portion of said shaft is symmetrical with respect to the axis of rotation of said shaft.

7. A support and drive assembly as defined in claim 6 wherein said shaft has a substantially square cross section and said holes in said hubs are square.

8. A support and drive assembly as defined in claim 7 wherein said means for restraining said one sprocket against axial movement include two sets of axially spaced slots in the corners of said shaft and C rings engaged around said shaft and in said slots adjacent opposite ends of said hub of said one sprocket.

9. A support and drive assembly as defined in claim 4 including at least three of said sprockets mounted on said shaft including a medial sprocket restrained against axial motion and the remaining sprockets being substantially freely movable axially.

10. A support and drive assembly as defined in claim 9 wherein said medial sprocket is mounted to engage a belt substantially midway between the sides thereof.

11. A support and drive assembly as defined in claim 10 wherein said shaft has a substantially square cross section symmetrical with respect to the rotational axis of said shaft and said holes in said supports have square cross sections symmetrically located with respect to the peripheries of said sprockets.

12. A support and drive assembly as defined in claim 4 wherein each of said teeth includes a shoulder portion relatively wide axially, for engaging and supporting the end sections of a belt and a relatively narrow end portion for projecting into openings in the belt.

13. A support and drive assembly as defined in claim 12 wherein said wheel portion of each of said sprockets includes surface sections intermediate said teeth having noncircular surfaces providing clearance for the intermediate sections of the belt link modules.

14. A support and drive assembly as defined in claim 13 wherein said intermediate surface sections are substantially planar.

15. A support and drive assembly as defined in claim 12 wherein each of said sprockets includes an even number of said teeth and said end portions of alternate teeth are offset axially.

16. A support and drive assembly as defined in claim 4 wherein said shaft and said openings have substantially square cross sections symmetrical with respect to the axis of rotation of thereof and said sprockets are molded plastic units.

17. A support and drive assembly as defined in claim 16 wherein said means for restraining said one sprocket against axial movement include two sets of axially spaced slots in the corners of said shaft and C rings engaged around said shaft and in said slots adjacent opposite ends of said hub of said one sprocket.

* * * * *

Disclaimer 3,724,285.—*James M. Lapeyre*, New Orleans, La. CONVEYOR DRIVE. Patent dated Apr. 3, 1973. Disclaimer filed May 8, 1978, by the assignee, *The Laitram Corporation.*

Hereby enters this disclaimer to claims 18–22 of said patent.

[*Official Gazette September 5, 1978.*]